United States Patent

Matsushita

[11] Patent Number: 5,997,068
[45] Date of Patent: Dec. 7, 1999

[54] SEAT BACK ATTACHING CONSTRUCTION FOR A VEHICULAR SEAT

[75] Inventor: Yasuhiro Matsushita, Hamamatsu, Japan

[73] Assignee: Suzuki Motor Corporation, Hamamatsu, Japan

[21] Appl. No.: 09/053,242

[22] Filed: Apr. 1, 1998

[30] Foreign Application Priority Data

Apr. 1, 1997 [JP] Japan .................................... 9-082487

[51] Int. Cl.[6] .................................................. B60N 2/44
[52] U.S. Cl. ........................ 296/63; 296/65.16; 296/198
[58] Field of Search ................................. 296/63, 65.16, 296/195, 198, 203.04, 204

[56] References Cited

U.S. PATENT DOCUMENTS

| | | | |
|---|---|---|---|
| 4,408,794 | 10/1983 | Harasaki | 296/198 |
| 4,919,474 | 4/1990 | Adachi et al. | 296/194 |
| 5,273,336 | 12/1993 | Schubring et al. | 296/65.1 |
| 5,611,592 | 3/1997 | Satou et al. | 296/203 |
| 5,829,824 | 11/1998 | Yamamuro et al. | 296/204 |

FOREIGN PATENT DOCUMENTS

| | | | |
|---|---|---|---|
| 64-7068 | 10/1985 | Japan . | |
| 2507134 | 1/1992 | Japan . | |
| 404019281 | 1/1992 | Japan | 296/203.04 |
| 2172801 | 10/1986 | United Kingdom | 296/65.16 |

*Primary Examiner*—D. Glenn Dayoan
*Assistant Examiner*—Paul Chenevert
*Attorney, Agent, or Firm*—Alston & Bird LLP

[57] ABSTRACT

In a seat back attaching construction for a vehicular seat in which an arm member is provided at least on one side of a seat back for a vehicular seat, and the arm member is assembled to a support bracket attached to the vehicle body, an extension portion 12 extending toward a wheel house inner panel 10 is provided at a part of a side member 11 composing the lower part of vehicle body, the lower end portion of the support bracket 6 is disposed and joined between the opposed surfaces of the extension portion 12 and the wheel house inner panel 10, and the upper part of the support bracket 6 is joined to the wheel house inner panel 10. Thereby, the attaching accuracy and attaching rigidity of the support bracket for supporting the seat back for a vehicular seat is increased, and the rigidity of a wheel house to which the support bracket is attached is enhanced.

16 Claims, 8 Drawing Sheets

SEAT BACK ATTACHING CONSTRUCTION FOR A VEHICULAR SEAT

FIELD OF THE INVENTION AND RELATED ART STATEMENT

The present invention relates to a seat back attaching construction for a vehicular seat, which can increase the attaching accuracy and attaching rigidity of a support bracket for supporting a seat back and can enhance the rigidity of a wheel house to which the support bracket is attached.

Conventionally, some vehicular seats are constructed, as shown in FIG. 7, so that the seat is composed of a seat cushion 100 and a seat back 101 and that the seat back 101 can be tilted forward by means of a hinge mechanism 102. For this hinge mechanism 102, a hinge arm 103 is attached to the lower end part on each side of the seat back 101 by means of a screw 104, whereas a support bracket 105 is pivotally attached to the vehicle side or floor panel by means of a screw 106. The seat back, provided with a locking device, is usually held at an erected position.

FIGS. 8 and 9 show a prior art (Japanese Patent No. 2507134) in which a support bracket 107 is attached to the vehicle side.

According to this prior art, a flange portion 108 of the support bracket 107 is spot welded to an edge rising portion 110 of a rear floor panel 109. A rear side member 111 is disposed on the lower surface of the rear floor panel 109, and a rising extension portion 112 of the rear side member 111 is in contact with the outside surface of the edge rising portion 110 of the rear floor panel 109. The flange portion 108 of the support bracket 107 is spot welded to a portion where the edge rising portion 110 of the rear floor panel 109 laps over the rising extension portion 112 of the rear side member 111. At the upper part over the edge rising portion 110 of the rear floor panel 109, the flange portion 108 of the support bracket 107 is welded to a portion where the rising extension portion 112 of the rear side member 111 laps over a rear wheel house inner panel 113.

After the rear floor panel 109 is installed to the vehicle body, a hinge arm 115 attached to a seat back 114 for the rear seat is screwed to the support bracket 107 using a screw 116, by which the seat back 114 is attached rotatably.

In assembling, the flange portion 108 of the support bracket 107 is welded beforehand to the rising extension portion 112 of the rear side member 111 and the edge rising portion 110 of the rear floor panel 109, and the rear wheel house inner panel 113 is disposed and joined to the outside of the rising extension portion 112 of the rear side member 111. Thereby, the attaching accuracy is increased and the construction is simplified.

However, in the above-mentioned vehicular seat back attaching construction, although the support bracket 107 is joined by using the flange portion 108, the joint area of the flange portion 108 is small, so that the attaching strength is limited. Therefore, in the near future, enough strength and rigidity to pass the European box test (protection of passenger from luggage), adoption of which is being studied in EC, cannot be obtained.

OBJECT AND SUMMARY OF THE INVENTION

The present invention was made to solve the above problem, and accordingly an object thereof is to provide a seat back attaching construction for a vehicular seat, which can increase the attaching accuracy and attaching rigidity of a support bracket for supporting a seat back for a vehicular seat and can enhance the rigidity of a wheel house to which the support bracket is attached.

To achieve the above object, the present invention provides a seat back attaching construction for a vehicular seat in which an arm member is provided at least on one side of a seat back for a vehicular seat, and the arm member is assembled to a support bracket attached to the vehicle body, characterized in that an extension portion extending toward a wheel house inner panel is provided at a part of a side member composing the lower part of the vehicle body, the lower end portion of the support bracket is disposed and joined between the opposed surfaces of the extension portion and the wheel house inner panel, and the upper part of the support bracket is joined to the wheel house inner panel.

Also, the present invention provides a seat back attaching construction for a vehicular seat in which an arm member is provided at least on one side of a seat back for a vehicular seat, and the arm member is assembled to a support bracket attached to the vehicle body, characterized in that an extension portion extending toward a wheel house inner panel is provided at a part of a side member composing the lower part of vehicle body, the lower end portion of the support bracket is disposed and joined between the opposed surfaces of the extension portion and the wheel house inner panel, the upper part of the support bracket is joined to the wheel house inner panel, and a rising portion provided at both sides of a rear floor to which the vehicular seat is disposed is joined to the extension portion of the side member and the wheel house inner panel.

Further, the present invention provides a seat back attaching construction for a vehicular seat which is configured so as to be tilted forward by providing an arm member serving as a hinge arm at least on one side of a seat back for a vehicular seat, and by rotatably assembling the arm member to a support bracket serving as a hinge bracket attached to the vehicle body, characterized in that an extension portion extending toward a wheel house inner panel is provided at a part of a side member, the lower end portion of the support bracket is joined between the opposed surfaces of the extension portion and the wheel house inner panel, and the upper part of the support bracket is Joined to the wheel house inner panel.

Still further, the present invention provides a seat back attaching construction for a vehicular seat which is configured so as to be tilted forward by providing an arm member serving as a hinge arm at least on one side of a seat back for a vehicular seat, and by rotatably assembling the arm member to a support bracket serving as a hinge bracket attached to the vehicle body, characterized in that an extension portion extending toward a wheel house inner panel is provided at a part of a side member, the lower end portion of the support bracket is joined between the opposed surfaces of the extension portion and the wheel house inner panel, the upper part of the support bracket is joined to the wheel house inner panel, and a rising portion provided at both sides of a rear floor to which the vehicular seat is disposed is joined to the extension portion of the side member and the wheel house inner panel.

Also, according to the present invention, the upper part of the support bracket is extended at least to the vicinity of an upper flange portion of the wheel house inner panel.

Further, according to the present invention, a bead portion is provided in the lengthwise direction of the support bracket, and preferably the surroundings of the bead portion are joined to the wheel house inner panel.

DETAILED DESCRIPTION OF PREFERRED EMBODIMENTS

Embodiments of the present invention will be described in detail with reference to the accompanying drawings.

Figure 1:
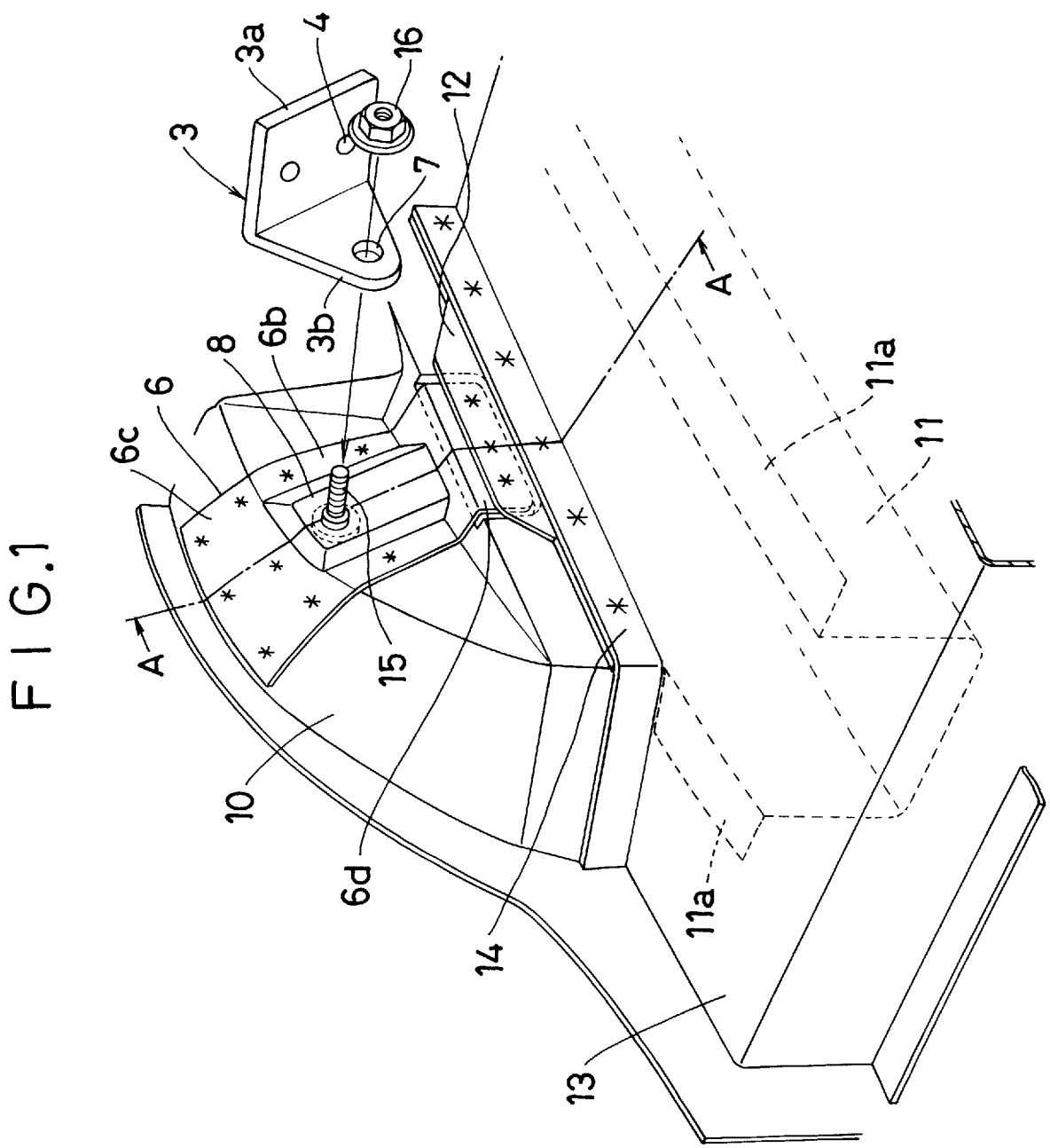
FIG. 1 is a perspective view showing an embodiment of a seat back attaching construction for a vehicular seat in accordance with the present invention.
Figure 2:
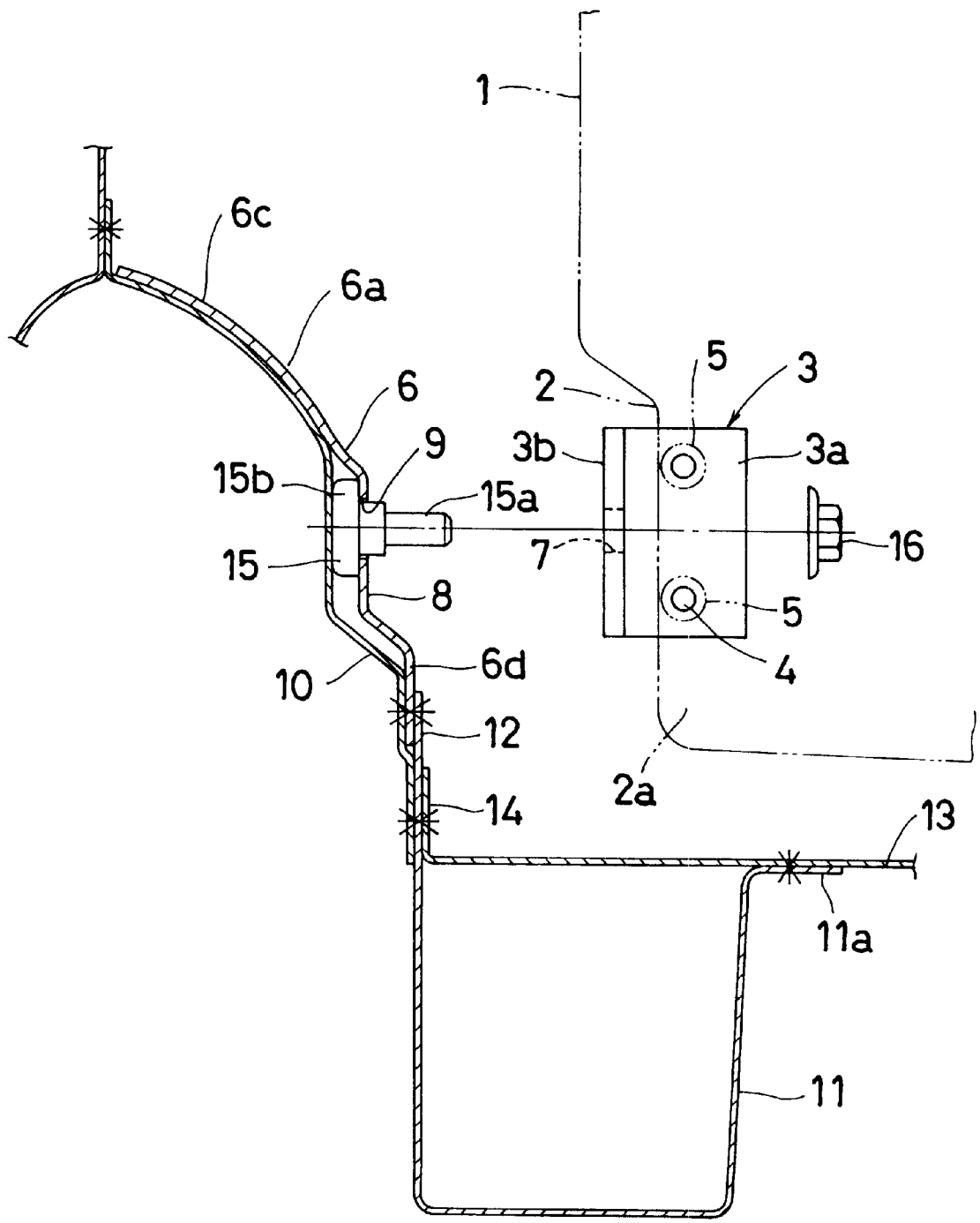
FIG. 2 is a sectional view taken along the line A—A of FIG. 1.

FIG. 1 is a perspective view showing an embodiment of a seat back attaching construction for a vehicular seat in accordance with the present invention, and FIG. 2 is a sectional view taken along the line A—A of FIG. 1.

In FIGS. 1 and 2, reference numeral 1 denotes a seat back for rear seat, and a recess 2 is provided at the lower end on both sides of the seat back 1. A substantially L-shaped arm member 3 is mounted as a hinge arm on a front surface 2a where the recess 2 of the seat back 1 is provided.

The arm member 3, which is formed with a plurality of screw holes 4 on the attaching face 3a thereof, is attached to a frame member (not shown) etc., which is mounted in the seat back 1, via screws 5 in the screw holes 4.

On the other side face 3b of the arm member 3, which is perpendicular to the attaching face 3a, a screw hole 7 for attaching the arm member 3 to a support bracket (described below) serving as a hinge bracket is formed.

Figure 3:
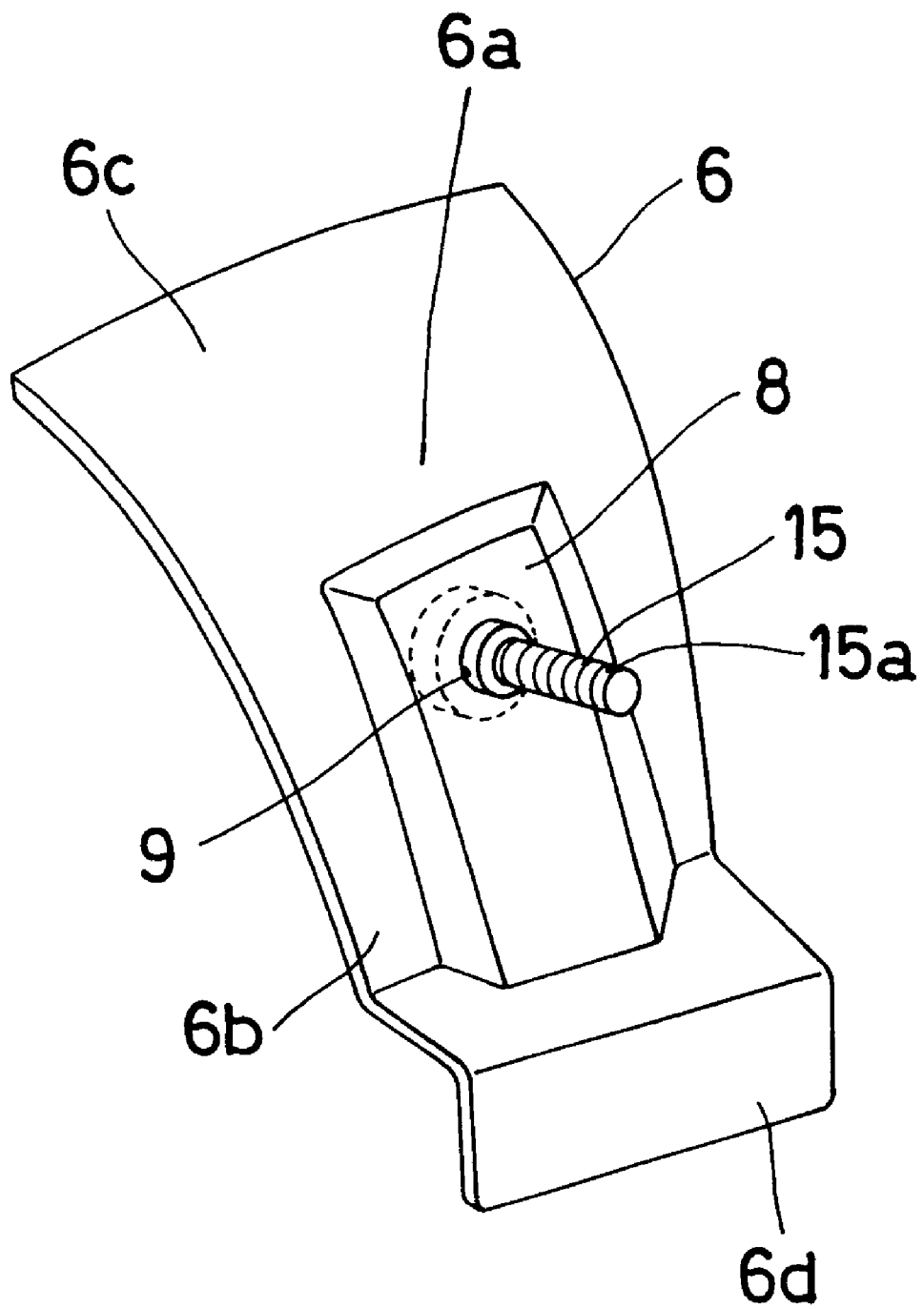
FIG. 3 is a perspective view of a support bracket shown in FIG. 1.

The support bracket 6 comprises a plate 6a curved along a wheel house inner panel 10, a bead portion 8 formed in the lengthwise direction at the center of the plate 6a, and a screw hole 9 formed at the bead portion 8, as shown in FIG. 3.

The support bracket 6 is joined to the wheel house inner panel 10 by spot welding both side portions 6b of the bead portion 8 and the upper portion 6c to the wheel house inner panel 10 and by disposing and spot welding the lower end portion 6d between the wheel house inner panel 10 and an extension portion 12 of a rear side member 11.

The rear side member 11 is a substantially U-shaped member whose upper part is open, and flange portions 11a thereof provided on both sides of the upper part are joined to the lower surface of a rear floor panel 13. The extension portion 12, which is extended upward by raising a part of the flange portion 11a upward, is formed at an intermediate portion of the flange portion 11a.

On both sides of the rear floor panel 13, a rising portion 14 is provided, and the rising portion 14 is jointed by spot welding to the wheel house inner panel 10 together with the extension portion 12 of the rear side member 11.

On the support bracket 6, a shoulder bolt 15 in which a screw portion 15a is inserted is attached to the screw hole 9 provided in the bead portion 8, and the shoulder bolt 15 is fixed by welding a bolt head 15b onto the back surface of the support bracket 6. The screw portion 15a of the shoulder bolt 15 is inserted into the screw hole 7 of the other side face 3b of the arm member 3, and a collar nut 16 is screwed on the screw portion 15a, by which the other side face 3b of the arm member 3 is supported.

The following is a description of the operation of the present invention configured as described above.

When the seat back 1 for rear seat is attached, the screw portion 15a of the shoulder bolt 15 mounted to the support bracket 6 is inserted into the screw hole 7 formed in the other side face 3b of the arm member 3 attached to each side of the seat back 1, by which the arm member 3 is assembled to the step portion of the shoulder bolt 15. Then, the collar nut 16 is screwed on the screw portion 15a to assemble the arm member 3 rotatably.

Next, the seat back 1 is fixed by a locking device (not shown).

Thus, the seat back 1 is supported so as to be capable of being tilted forward by releasing the locking device as necessary.

The above-described embodiment achieves the following effects.

Since the support bracket 6 is brought into contact with the wheel house inner panel 10 in a wide range and spot welded, the attaching accuracy is high, a sufficient rigidity can be achieved, and the rigidity of the wheel house inner panel 10 can be increased. Therefore, the wheel house inner panel 10 can be prevented from being brought inward to the room side by a shock applied to the wheel house inner panel 10 from the side. Also, since the lower end portion 6d of the support bracket 6 is joined by spot welding to the wheel house inner panel 10 and the extension portion 12 of the rear side member 11, the strength can be increased by the joint with the rigid rear side member 11. Therefore, a shock input applied to the seat back 1 from the luggage compartment can be transmitted to the rear side member 11, so that the attaching rigidity can be increased.

Further, since the rising portion 14 is provided on each side of the rear floor panel 13, and the rising portion 14 is joined by spot welding to the wheel house inner panel 10 together with the extension portion 12 of the rear side member 11, shock energy can be transmitted to the rear floor panel 13 and absorbed, so that the shock energy absorbing amount can be increased as compared with the conventional construction.

Figure 4:
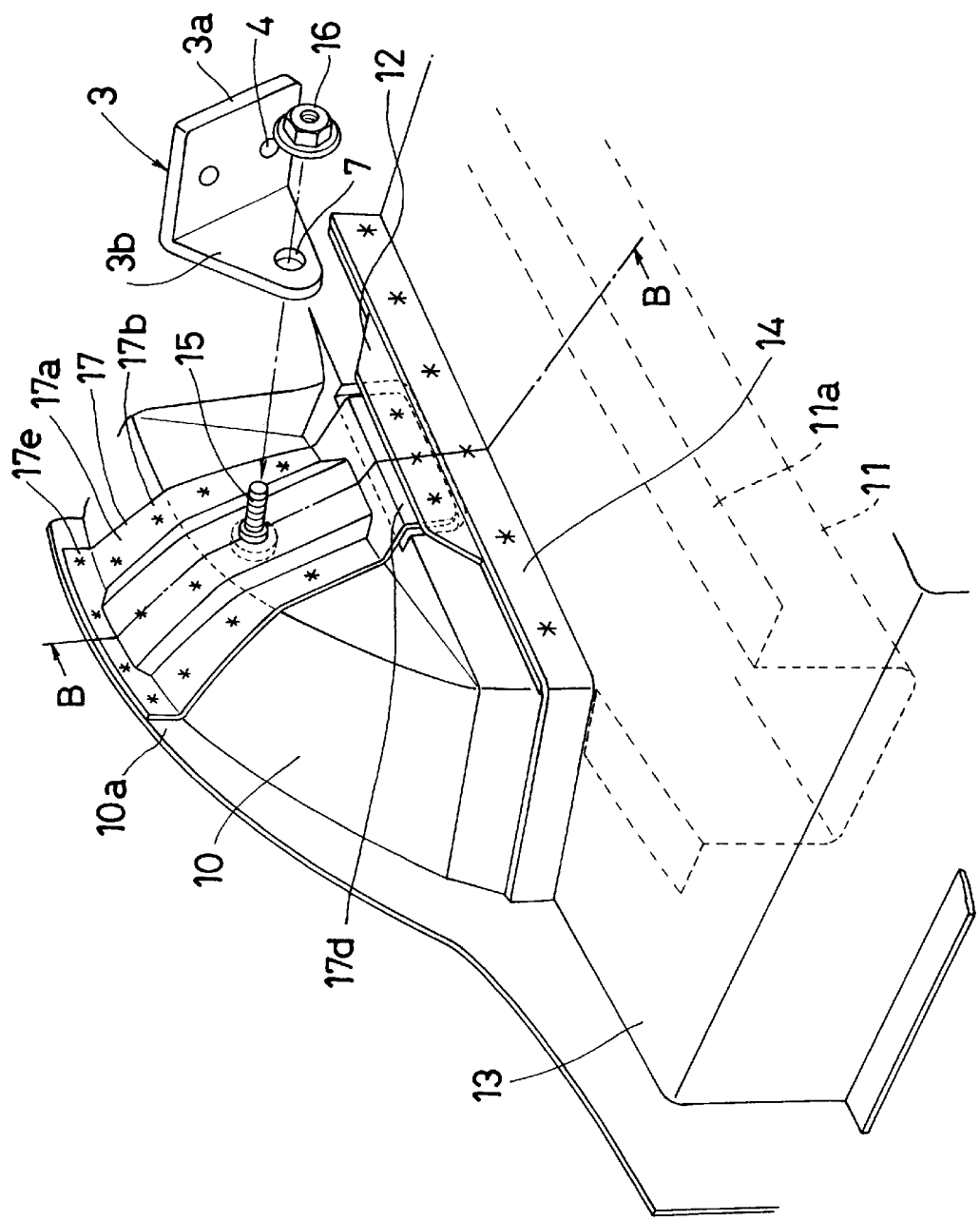
FIG. 4 is a perspective view showing another embodiment of a seat back attaching construction for a vehicular seat in accordance with the present invention.
Figure 5:
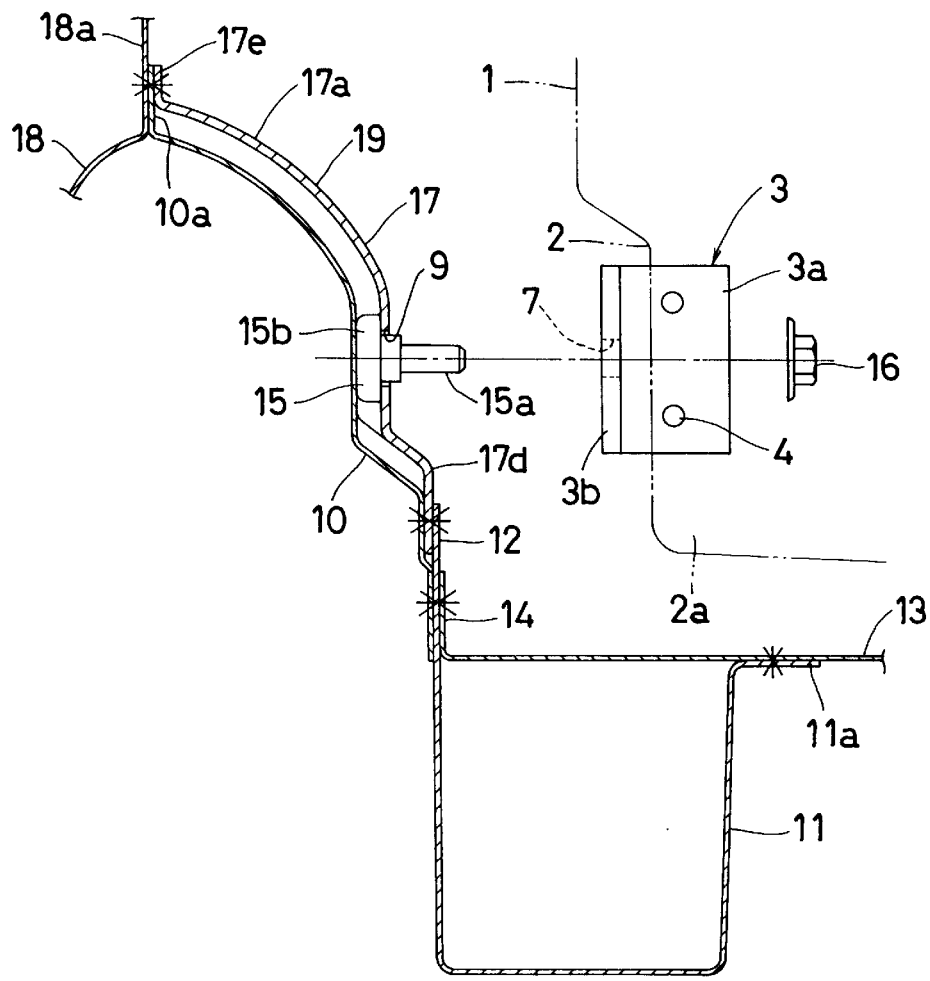
FIG. 5 is a sectional view taken along the line B—B of FIG. 4.
Figure 6:
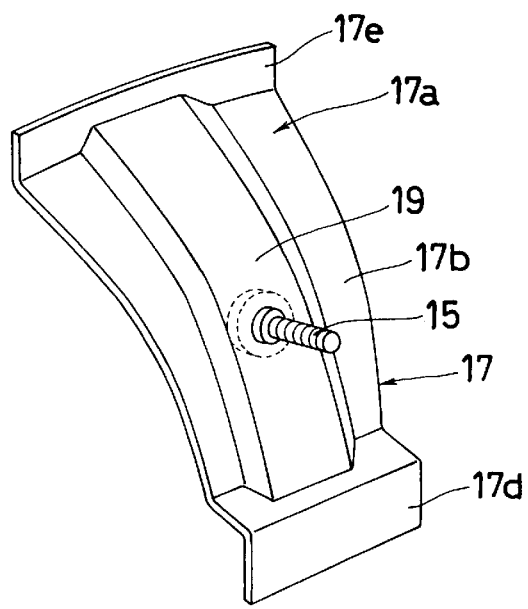
FIG. 6 is a perspective view of a support bracket shown in FIG. 4.
Figure 7:
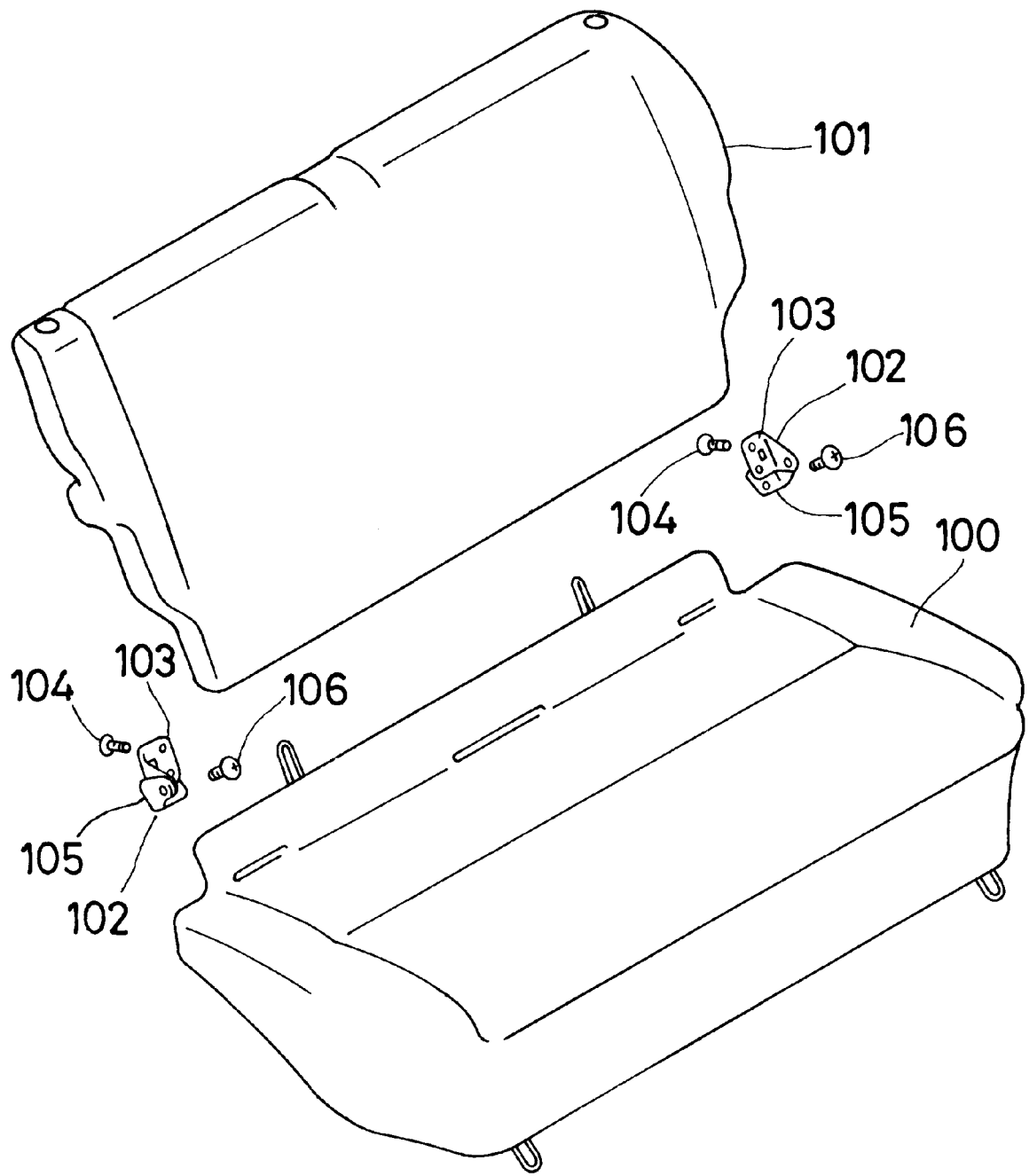
FIG. 7 is a perspective view of a conventional seat back attaching construction for a vehicular seat.
Figure 8:
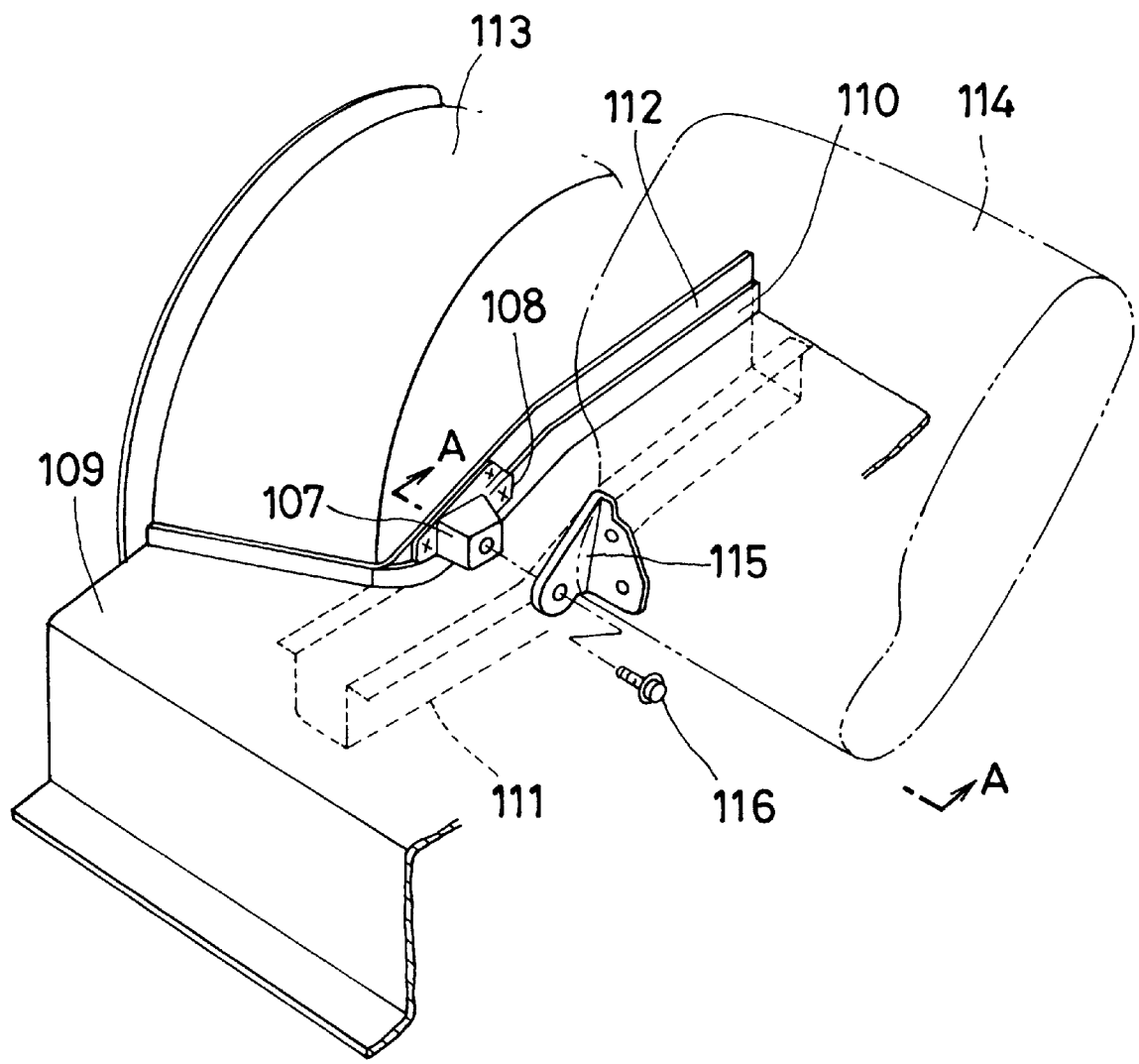
FIG. 8 is a perspective view of a conventional seat back attaching construction for a vehicular seat.
Figure 9:
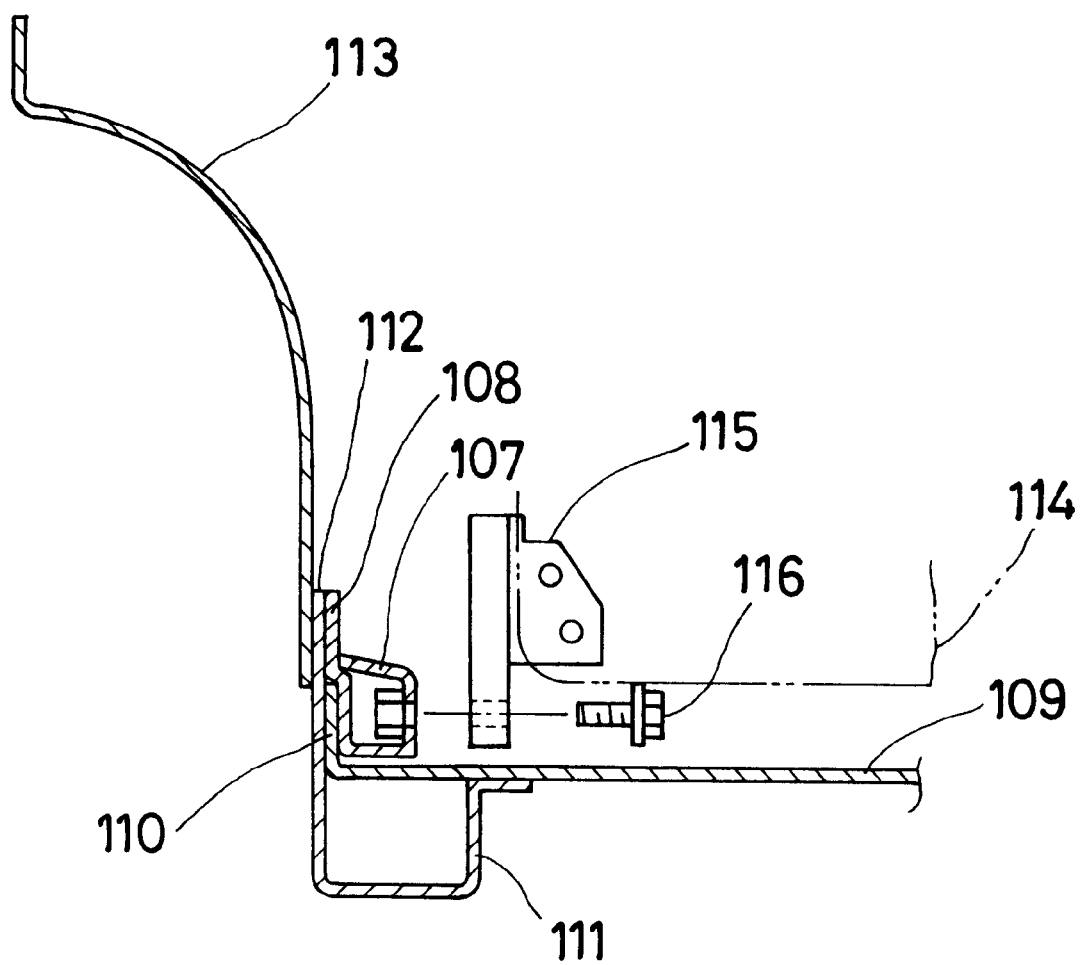
FIG. 9 is a sectional view taken along the line A—A of FIG. 8.

FIGS. 4 to 6 show another embodiment of the present invention. In these figures, the same reference numerals are applied to the same elements as those shown in FIGS. 1 to 3, and the explanation thereof is omitted.

In this embodiment, a plate 17a of a support bracket 17 extends to a flange portion 10a of a wheel house inner panel 10, and this extension portion 17e is joined to the joint portion between the flange portion 10a of the wheel house inner panel 10 and a flange portion 18a of a wheel house outer panel 18. A bead portion 19 extending to the flange portion 10a of the wheel house inner panel 10 is provided on the plate 17a of the support bracket 17, and both side portions 17b of the bead portion 19 are spot welded to the wheel house inner panel 10. A lower end portion 17d of the support bracket 17 is disposed and spot welded between the wheel house inner panel 10 and an extension portion 12 of a rear side member 11.

According to this embodiment, the support bracket 17 is extended to the flange portion 10a of the wheel house inner panel 10, and this extension portion 17e is joined to the joint portion between the flange portion 10a of the wheel house inner panel 10 and a flange portion 18a of a wheel house outer panel 18. Therefore, the rigidity of the wheel house inner panel 10 can be increased further. Also, since the bead portion 19 is provided on the plate 17a of the support bracket 17 so as to extend to the flange portion 10a of the wheel house inner panel 10, the rigidity of the support bracket 17 can be improved.

The present invention is not limited to the above-described embodiments. The shape of the support bracket 6 and support bracket 17 is not limited to an elongated one, and can be set variously if the shape is such that the support bracket 6, 17 can be joined to the wheel house inner panel 10. Also, the length, shape, and number of the bead portion 8 and bead portion 19 can be set as necessary. Further, the joint of the support bracket 6 and support bracket 17 is not limited to the shoulder bolt 15 and the collar nut 16, and other support members can be used if the seat back 1 can be tilted.

Also, the application of the present invention is not limited to a rear seat, and the present invention can be applied to any seat which is supported so as to be tilted forward by attaching the support bracket to the wheel house inner panel 10.

As described above, the seat back attaching construction for a vehicular seat in accordance with the present invention can achieve the following effects.

In particular, according to the present invention, a seat back attaching construction for a vehicular seat is provided in which an arm member on at least one side of a seat back for a vehicular seat assembled to a support bracket attached to the vehicle body. Advantageously, the seat back is configured for tilting forward by configuring the arm member on the seat back as a hinge arm, and by rotatably assembling the arm member to the support bracket which serves as a hinge bracket. In accord with the invention, an extension portion extending toward a wheel house inner panel is provided at a part of a side member composing the lower part of vehicle body, the lower end portion of the support bracket is disposed and joined between the opposed surfaces of the extension portion and the wheel house inner panel, and the upper part of the support bracket is joined to the wheel house inner panel. Therefore, the support bracket is joined in contact with the surface of the wheel house inner panel, so that the attaching accuracy of the support bracket can be increased. Thereupon, the wheel house inner panel can be prevented from being brought inward to the room side by a shock applied to the wheel house inner panel from the side.

Also, since the lower end portion of support bracket is joined between the wheel house inner panel and the extension portion of rear side member, the strength can be increased by the joint with the rigid rear side member. Therefore, a shock input applied to the seat back from the luggage compartment can be transmitted to the rear side member, so that the attaching rigidity can be increased.

Also, according to the present invention, in a seat back attaching construction for a vehicular seat in which an arm member, preferably configured as a hinge arm, is provided at least on one side of a seat back for a vehicular seat, and the arm member is assembled to a support bracket, preferably configured as a hinge bracket, attached to the vehicle body, an extension portion extending toward a wheel house inner panel is provided at a part of a side member composing the lower part of vehicle body, the lower end portion of the support bracket is disposed and joined between the opposed surfaces of the extension portion and the wheel house inner panel, the upper part of the support bracket is joined to the wheel house inner panel, and a rising portion provided at both sides of a rear floor to which the vehicular seat is disposed is joined to the extension portion of the side member and the wheel house inner panel. Therefore, the support bracket is joined in contact with the surface of the wheel house inner panel, so that the attaching accuracy of the support bracket can be increased. Thereupon, the wheel house inner panel can be prevented from being brought inward to the room side by a shock applied to the wheel house inner panel from the side.

Also, since the lower end portion of support bracket is joined between the wheel house inner panel and the extension portion of rear side member, the strength can be increased by the joint with the rigid rear side member. Therefore, a shock input applied to the seat back from the luggage compartment can be transmitted to the rear side member, so that the attaching rigidity can be increased. Since the rising portion provided at both sides of the rear floor is joined to the rear side member at a position separate from the support bracket, the rising portion can be joined to the rear side member without the use of four-plate joint, so that a sufficient rigidity can be obtained, and at the same time the productivity of welding work can be improved.

Further, since the rising portion is joined by spot welding to the wheel house inner panel together with the extension portion of the rear side member, shock energy can be transmitted to the rear floor panel and absorbed, so that the shock energy absorbing amount can be increased as compared with the conventional construction.

Since the upper part of the support bracket is extended at least to the vicinity of the upper flange portion of the wheel house inner panel, the rigidity of the wheel house inner panel is increased, and the wheel house inner panel can be prevented from being brought inward.

Since the bead portion is provided in the lengthwise direction of the support bracket, the rigidity of the support bracket can be increased. Therefore, the rigidity of the wheel house inner panel is increased, and the wheel house inner panel can be prevented from being brought inward.

It is claimed:

1. A seat back attaching construction for a vehicular seat in which an arm member is provided at least on one side of a seat back of the vehicular seat for securing the vehicular seat to a body of a vehicle, and comprising:

a wheel house inner panel forming part of the vehicle body;

an extension portion of the vehicle body which extends toward the wheel house inner panel and includes a surface opposing a surface of the wheel house inner panel; and a support bracket attached to the wheel house inner panel, a lower end portion of said support bracket being disposed and joined between the opposed surfaces of the extension portion and the wheel house inner panel, and an upper part of said support bracket being joined to the wheel house inner panel.

2. A seat back attaching construction for a vehicular seat according to claim 1, wherein the upper part of said support bracket is extended at least to the vicinity of an upper flange portion of the wheel house inner panel.

3. A seat back attaching construction for a vehicular seat according to claim 1, wherein a bead portion is provided in the lengthwise direction of said support bracket.

4. A seat back attaching construction for a vehicular seat according to claim 1, wherein a bead portion is provided in the lengthwise direction of said support bracket, and portions of the support bracket surrounding said bead portion are joined to the wheel house inner panel.

5. A seat back attaching construction for a vehicular seat in which an arm member is provided at least on one side of a seat back of the vehicular seat for securing the vehicular seat to a body of a vehicle, and comprising:

a wheel house inner panel forming part of the vehicle body;

an extension portion of the vehicle body which extends toward the wheel house inner panel and includes a surface opposing a surface of the wheel house inner panel; and a support bracket attached to the wheel house inner panel, a lower end portion of said support bracket being disposed and joined between the opposed surfaces of the extension portion and the wheel house inner panel, an upper part of said support bracket being joined to the wheel house inner panel, and;

a rising portion provided at both sides of a rear floor to which said vehicular seat is disposed and joined to the extension portion and the wheel house inner panel.

6. A seat back attaching construction for a vehicular seat according to claim 5, wherein the upper part of said support bracket is extended at least to the vicinity of an upper flange portion of the wheel house inner panel.

7. A seat back attaching construction for a vehicular seat according to claim 5, wherein a bead portion is provided in the lengthwise direction of said support bracket.

8. A seat back attaching construction for a vehicular seat according to claim 5, wherein a bead portion is provided in the lengthwise direction of said support bracket, and portions of the support bracket surrounding said bead portion are joined to the wheel house inner panel.

9. A seat back attaching construction for a vehicular seat which is configured so as to be tilted forward by providing an arm member serving as a hinge arm at least on one side of a seat back of the vehicular seat for rotatable attaching the vehicular seat to a body of a vehicle, and comprising:

a wheel house inner panel forming part of the vehicle body;

an extension portion of the vehicle body which extends toward the wheel house inner panel and includes a surface opposing a surface of the wheel house inner panel; and a support bracket serving as a hinge bracket attached to the wheel house inner panel, a lower end portion of said support bracket being joined between the opposed surfaces of the extension portion and the wheel house inner panel, and an upper part of said support bracket being joined to the wheel house inner panel.

10. A seat back attaching construction for a vehicular seat according to claim 9, wherein the upper part of said support bracket is extended at least to the vicinity of an upper flange portion of the wheel house inner panel.

11. A seat back attaching construction for a vehicular seat according to claim 9, wherein a bead portion is provided in the lengthwise direction of said support bracket.

12. A seat back attaching construction for a vehicular seat according to claim 9, wherein a bead portion is provided in the lengthwise direction of said support bracket, and portions of the support bracket surrounding said bead portion are joined to the wheel house inner panel.

13. A seat back attaching construction for a vehicular seat which is configured so as to be tilted forward by providing an arm member serving as a hinge arm at least on one side of a seat back of the vehicular seat for rotatably attaching the vehicular seat to a body of a vehicle, and comprising:

a wheel house inner panel forming part of the vehicle body;

an extension portion of the vehicle body which extends toward the wheel house inner panel and includes a surface opposing a surface of the wheel house inner panel; and a support bracket serving as a hinge bracket attached to the wheel house inner panel, a lower end portion of said support bracket being joined between the opposed surfaces of the extension portion and the wheel house inner panel, and;

a rising portion provided at both sides of a rear floor to which said vehicular seat is disposed and joined to the extension portion and the wheel house inner panel.

14. A seat back attaching construction for a vehicular seat according to claim 13, wherein the upper part of said support bracket is extended at least to the vicinity of an upper flange portion of the wheel house inner panel.

15. A seat back attaching construction for a vehicular seat according to claim 13, wherein a bead portion is provided in the lengthwise direction of said support bracket.

16. A seat back attaching construction for a vehicular seat according to claim 13, wherein a bead portion is provided in the lengthwise direction of said support bracket, and portions of the support bracket surrounding said bead portion are joined to the wheel house inner panel.

* * * * *